(12) United States Patent
Ikeda

(10) Patent No.: US 11,336,087 B2
(45) Date of Patent: May 17, 2022

(54) ELECTRONIC CIRCUIT AND ELECTRONIC APPARATUS

(71) Applicant: KABUSHIKI KAISHA TOSHIBA, Tokyo (JP)

(72) Inventor: Kentaro Ikeda, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/017,173

(22) Filed: Sep. 10, 2020

(65) Prior Publication Data

US 2021/0126449 A1    Apr. 29, 2021

(30) Foreign Application Priority Data

Oct. 23, 2019    (JP) .............................. JP2019-192829

(51) Int. Cl.
| | |
|---|---|
| *H02M 1/00* | (2006.01) |
| *H02M 1/32* | (2007.01) |
| *H02M 1/34* | (2007.01) |
| *H02M 1/44* | (2007.01) |
| *H02H 9/04* | (2006.01) |
| *H02H 9/00* | (2006.01) |
| *H02M 7/5387* | (2007.01) |

(52) U.S. Cl.
CPC .............. *H02H 9/04* (2013.01); *H02H 9/005* (2013.01); *H02M 1/32* (2013.01)

(58) Field of Classification Search
CPC .......... H02M 1/08; H02M 1/088; H02M 1/44; H02M 7/53871; H02M 1/346; H02M 1/0054; H02M 1/32; H02H 9/005; H02H 9/04

See application file for complete search history.

(56) References Cited

U.S. PATENT DOCUMENTS

| | | | | |
|---|---|---|---|---|
| 4,384,287 A | * | 5/1983 | Sakuma | ................. G09G 3/296 315/169.4 |
| 6,091,274 A | * | 7/2000 | Preslar | ............... H03K 17/0822 327/110 |
| 6,617,906 B1 | * | 9/2003 | Hastings | .................. H03K 5/08 327/309 |
| 7,053,678 B2 | * | 5/2006 | Scollo | .............. H03K 17/04126 327/108 |
| 7,671,636 B2 | | 3/2010 | Aoki et al. | |
| 8,050,064 B2 | | 11/2011 | Kuno et al. | |
| 8,878,573 B2 | | 11/2014 | Sugahara | |

(Continued)

FOREIGN PATENT DOCUMENTS

| | | |
|---|---|---|
| JP | 2006-230168 A | 8/2006 |
| JP | 2008-67140 A | 3/2008 |

(Continued)

*Primary Examiner* — Sisay G Tiku

(74) *Attorney, Agent, or Firm* — Finnegan, Henderson, Farabow, Garrett & Dunner L.L.P.

(57) ABSTRACT

An electronic circuit includes a diode configured to carry a surge current generated by switching of a first transistor, a capacitor connected between a cathode of the diode and a control electrode of the first transistor, and a first variable impedance circuit configured to vary an impedance between the control electrode of the first transistor and a first reference voltage node according to the surge current flowing to the diode.

18 Claims, 12 Drawing Sheets

(56) References Cited

U.S. PATENT DOCUMENTS

| | | | | |
|---|---|---|---|---|
| 9,337,827 B2* | 5/2016 | Werber | ............... | H01L 29/0696 |
| 9,382,893 B2* | 7/2016 | Nakamura | ............ | H03K 17/163 |
| 9,793,824 B2* | 10/2017 | Takao | .................. | H03K 17/166 |
| 9,800,237 B2* | 10/2017 | Akama | ................... | G05F 1/565 |
| 9,806,706 B2* | 10/2017 | Hasegawa | ............. | H02M 3/337 |
| 9,935,551 B2* | 4/2018 | Kataoka | ................ | H03K 17/08 |
| 10,081,253 B2* | 9/2018 | Fukuta | ................ | H03K 17/168 |
| 2008/0012610 A1* | 1/2008 | Aoki | ................... | H01L 27/0255 |
| | | | | 327/109 |
| 2012/0299624 A1* | 11/2012 | Sugahara | ............ | H03K 17/161 |
| | | | | 327/109 |
| 2017/0104416 A1* | 4/2017 | Kataoka | .............. | H03K 17/162 |

FOREIGN PATENT DOCUMENTS

| | | |
|---|---|---|
| JP | 2008-199821 A | 8/2008 |
| JP | 2011-55695 A | 3/2011 |
| JP | 2012-249357 A | 12/2012 |

\* cited by examiner

ELECTRONIC CIRCUIT AND ELECTRONIC APPARATUS

CROSS REFERENCE TO RELATED APPLICATIONS

This application is based upon and claims the benefit of priority from the prior Japanese Patent Application No. 2019-192829, filed on Oct. 23, 2019, the entire contents of which are incorporated herein by reference.

FIELD

Embodiments of the present disclosure relate to an electronic circuit and an electronic apparatus.

BACKGROUND

Turning on or off a switching element that drives a motor or the like could cause a surge voltage, and the generation of the surge voltage could be accompanied by ringing.

Since a surge voltage and ringing could cause switching loss, equipment failure, and noise, it is desirable to prevent them to the extent possible.

DETAILED DESCRIPTION

According to one embodiment, an electronic circuit includes a diode configured to carry a surge current generated by switching of a first transistor, a capacitor connected between a cathode of the diode and a control electrode of the first transistor, and a first variable impedance circuit configured to vary an impedance between the control electrode of the first transistor and a first reference voltage node according to the surge current flowing to the diode.

Hereinafter, embodiments of a surge control circuit and a power transducer will be described with reference to the drawings. Hereinafter mainly described are main components of the surge control circuit and the power transducer, but the surge control circuit and the power transducer may have components and functions which are not illustrated or described. The following description does not intend to exclude components or functions not illustrated or described.

First Embodiment

Figure 1:
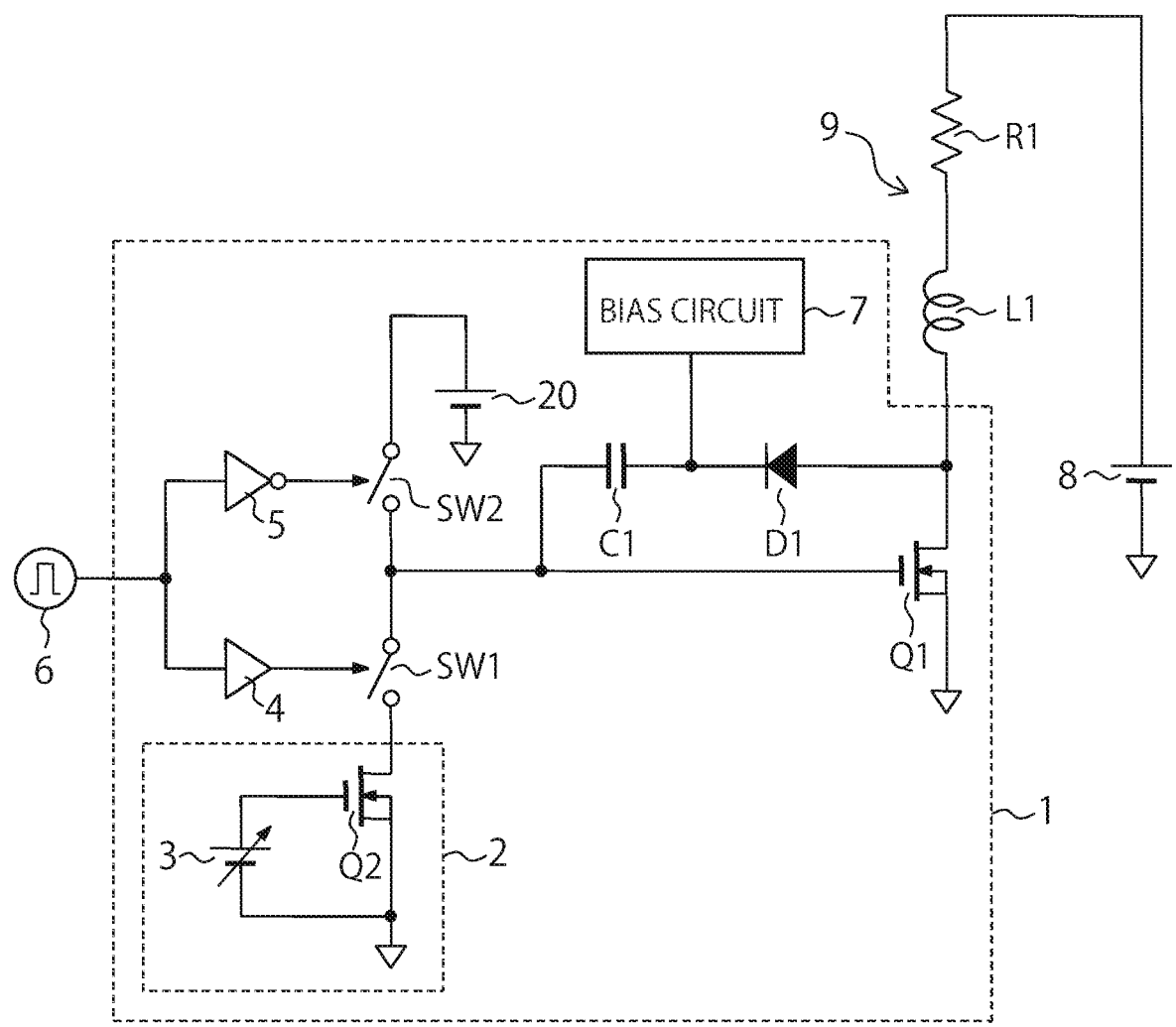
FIG. 1 is a circuit diagram of a surge control circuit according to a first embodiment.

FIG. 1 is a circuit diagram of a surge control circuit 1 according to a first embodiment. The surge control circuit 1 can be also called as an electronic circuit. The surge control circuit 1 in FIG. 1 prevents a surge voltage and a surge current generated by switching of a first transistor Q1. The first transistor Q1 is a switching element such as a metal-oxide-semiconductor (MOS) transistor or an insulated gate bipolar transistor (IGBT) and is not limited in type. The first transistor Q1 controls a current flow between a first electrode and a second electrode by a voltage applied to a control electrode. Hereinafter, the first transistor Q1 is illustrated as an N-type MOS transistor.

In a case where the first transistor Q1 is an N-type MOSFET, the control electrode is a gate, the first electrode is a drain, and the second electrode is a source.

The surge control circuit 1 in FIG. 1 includes a diode D1, a capacitor C1, and a first variable impedance circuit 2.

The diode D1 carries a surge current generated by switching of the first transistor Q1. The capacitor C1 is connected between a cathode of the diode D1 and the gate of the first transistor Q1. More specifically, the diode D1 has an anode connected to the drain of the first transistor Q1 and has the cathode connected to one end of the capacitor C1. The other end of the capacitor C1 is connected to the gate of the first transistor Q1.

The first variable impedance circuit 2 varies an impedance between the gate of the first transistor Q1 and a first reference voltage node according to a surge current flowing to the diode D1. The first reference voltage node is, for example, a ground node. More specifically, the larger the amount of surge current flows to the diode D1, the more the first variable impedance circuit 2 increases the impedance between the control electrode of the first transistor Q1 and the first reference voltage node.

The first variable impedance circuit 2 may include a second transistor Q2 and a variable voltage source 3. The second transistor Q2 does not perform switching operation like the first transistor Q1 but performs analog operation. Herein, the analog operation indicates operation in a saturation region. The second transistor Q2 may be, for example, an N-type MOS transistor or a bipolar transistor. Herein, the second transistor Q2 is illustrated as an N-type MOS transistor.

The variable voltage source 3 is connected between the control electrode of the first transistor Q1 and the source (first reference voltage node).

Figure 2:
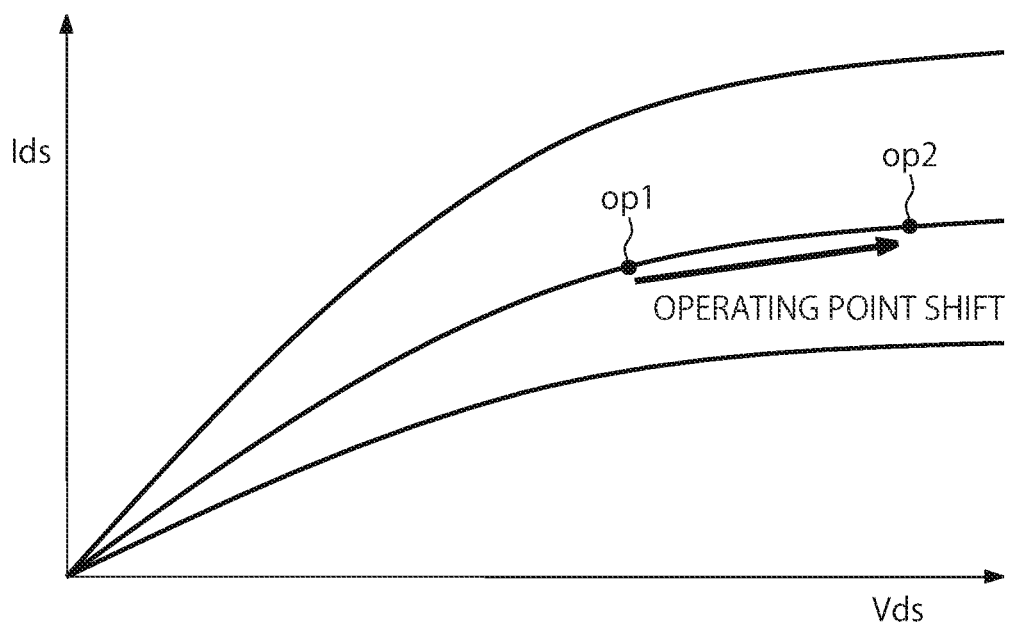
FIG. 2 is a graph illustrating I-V characteristics of a second transistor.

FIG. 2 is a graph illustrating I-V characteristics of the second transistor Q2. In FIG. 2, a drain-source voltage Vds of the second transistor Q2 is taken along the abscissa, and a drain-source current Ids is taken along the ordinate. When a surge current flows to the diode D1, the variable voltage source 3 adjusts a gate voltage at the second transistor Q2 to shift an operating point op1 of the second transistor Q2 to an operating point opt in the saturation region.

In this manner, the variable voltage source 3 sets a voltage at the control electrode of the second transistor Q2 to make a current flow between a first electrode and a second electrode of the second transistor Q2 vary linearly with respect to a voltage at the first electrode of the second transistor Q2 when a surge current flows to the diode D1. More specifically, the gate voltage at the second transistor Q2 is set to make the drain voltage and the drain current of the second transistor Q2 linear.

Although not illustrated in FIG. 1, a monitor unit configured to detect a drain-source voltage or a drain-source current of the first transistor Q1 may be provided, and the variable voltage source 3 may set the voltage at the control electrode of the second transistor Q2 based on the drain-source voltage or the drain-source current.

In addition, the surge control circuit 1 in FIG. 1 may include a first switch SW1, a second switch SW2, a first switching control unit 4, a second switching control unit 5, a control signal generator 6, and a bias circuit 7.

The first switch SW1 controls whether to set the gate of the first transistor Q1 to off-voltage at the first transistor Q1. The second switch SW2 controls whether to set the gate of the first transistor Q1 to on-voltage at the first transistor Q1.

The first switching control unit 4 controls switching of the first switch SW1 by a control signal generated by the control signal generator 6. The second switching control unit 5 controls switching of the second switch SW2 by an inverted signal of the control signal generated by the control signal generator 6.

The control signal generator 6 generates a control signal at the time of switching the first transistor Q1 as described later. For example, the first transistor Q1 may be turned off when the control signal is at a high level, and the first transistor Q1 may be turned on when the control signal is at a low level. The logic of the control signal and the on/off state of the first transistor Q1 are not limited.

The first variable impedance circuit 2 is electrically connected to the control electrode of the first transistor Q1 via the first switch SW1.

Next, the operation of the surge control circuit 1 according to this embodiment will be described. In the normal state, the first transistor Q1 is turned on or off according to the logic of the control signal output from the control signal generator 6. In a case where the first transistor Q1 is an N-type MOS transistor, for example, the first switch SW1 is turned on and the second switch SW2 is turned off when the control signal is at a high level. Accordingly, the gate of the first transistor Q1 becomes low potential, and the first transistor Q1 is turned off. When the control signal is at a low level, the first switch SW1 is turned off and the second switch SW2 is turned on. Accordingly, the gate of the first transistor Q1 becomes high potential, and the first transistor Q1 is turned on. Note that the first switch SW1 may be turned off and the second switch SW2 may be turned on when the control signal is at a high level.

When the first transistor Q1 is turned on, a current flows to a drive circuit 9 driven by the first transistor Q1. In the example illustrated in FIG. 1, the drive circuit 9 including a DC source 8, a resistor R1, and an inductor L1 connected in series is connected to the drain of the first transistor Q1. The drive circuit 9 may be, for example, a motor drive circuit. The drive circuit 9 may have any circuit configuration.

Figure 3:
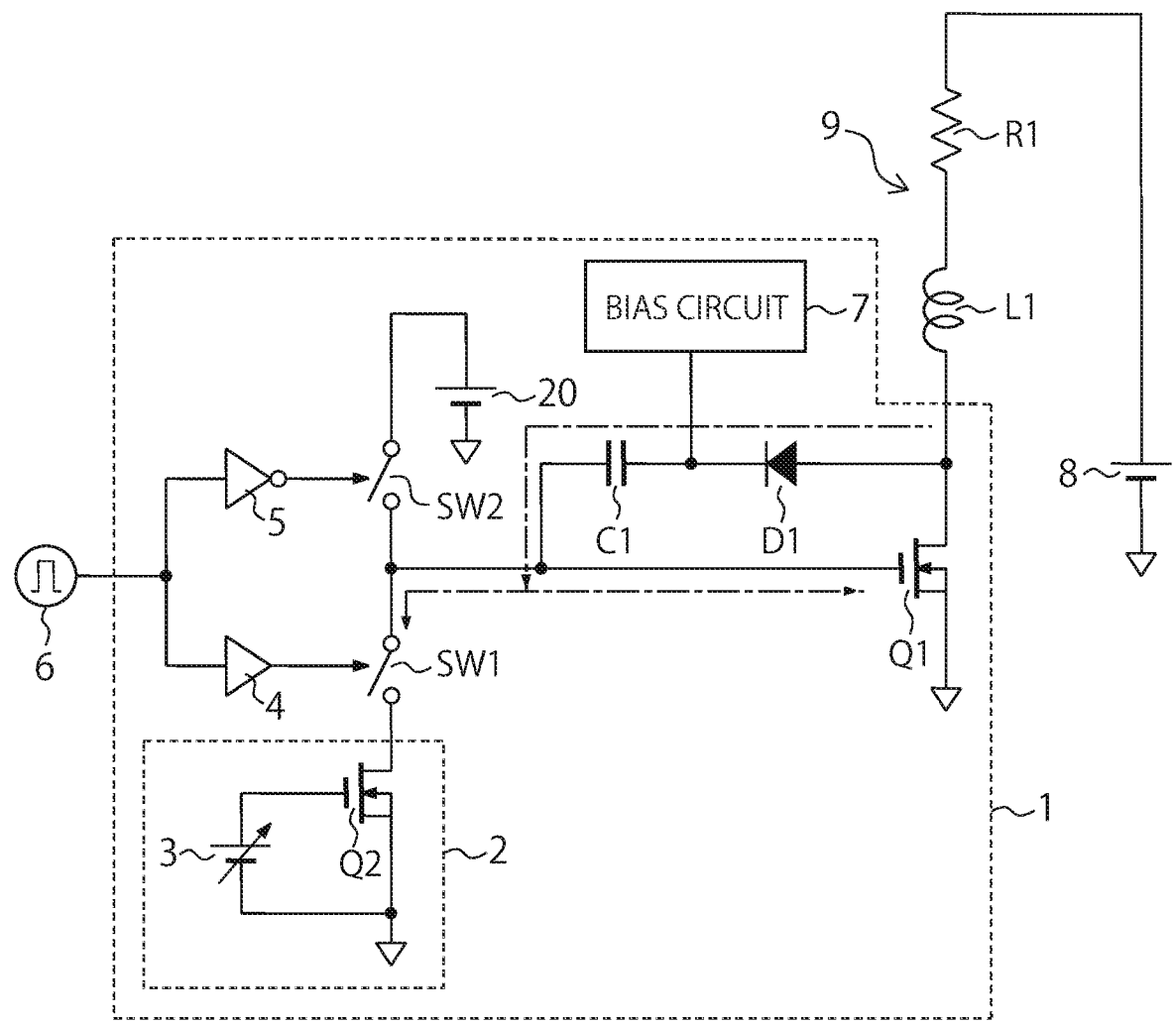
FIG. 3 is a view with arrowed lines illustrating the destination of a current flowing from an anode to a cathode of a diode.

When the first transistor Q1 performs switching operation, there is a possibility that a surge voltage or a surge current is generated in the drive circuit 9. In the surge control circuit 1 in FIG. 1, when a surge voltage or a surge current is generated in the drive circuit 9, a current flows from the anode to the cathode of the diode D1. FIG. 3 is a view with arrowed lines illustrating the destination of a current flowing from the anode to the cathode of the diode D1. As illustrated, the current flowing from the anode to the cathode of the diode D1 flows to the first variable impedance circuit 2 and the control electrode of the first transistor Q1.

The first variable impedance circuit 2 has characteristics that the impedance increases along with an increase in voltage at the control electrode of the first transistor Q1. Accordingly, when a surge voltage or a surge current is generated in the drive circuit 9, the more the current flowing from the anode to the cathode of the diode D1 increases, the more the impedance of the first variable impedance circuit 2 increases, which impairs a current flow to the first variable impedance circuit 2. Therefore, most of the current flowing from the anode to the cathode of the diode D1 does not flow to the first variable impedance circuit 2 but flows to the control electrode of the first transistor Q1. This indicates that the generation of a surge voltage or a surge current in the drive circuit 9 quickly raise the gate voltage at the control electrode of the first transistor Q1, which causes the ground node to absorb the surge current in the drive circuit 9 through the drain-source of the first transistor Q1.

As described above, when a forward current of the diode D1 increases with the generation of a surge voltage or a surge current due to the switching of the first transistor Q1, the first variable impedance circuit 2 raises not only the gate voltage at the first transistor Q1 but also the impedance between the gate of the first transistor Q1 and the first reference voltage node. This impairs the surge current flowing to the diode D1 and the capacitor C1 connected in series to flow to the first variable impedance circuit 2, which prevents a decrease in gate voltage at the first transistor Q1.

Figure 4:
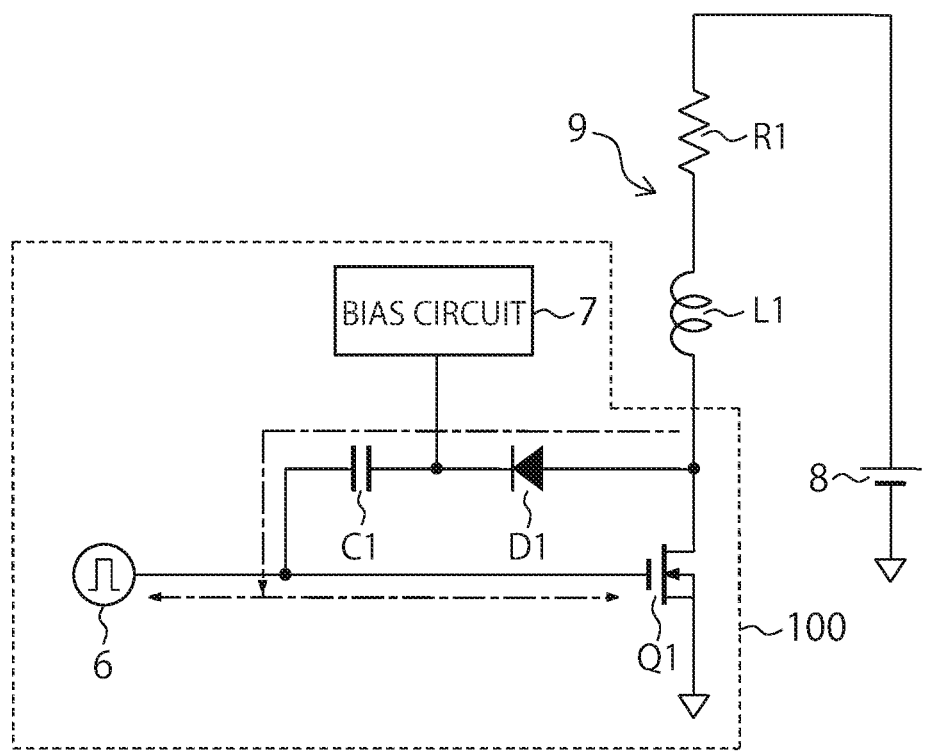
FIG. 4 is a circuit diagram of a surge control circuit of a comparative example in which a first variable impedance circuit is omitted from the surge control circuit in FIG. 1.

FIG. 4 is a circuit diagram of a surge control circuit 100 of a comparative example in which the first variable impedance circuit 2 is omitted from the surge control circuit 1 in FIG. 1. In FIG. 4, the first switch SW1, the second switch SW2, the first switching control unit 4, and the second switching control unit 5 are omitted for simplification. The surge control circuit 1 in FIG. 4 is similar to the surge control circuit 1 in FIG. 1 in that, when a surge voltage or a surge current is generated in the drive circuit 9 by the switching operation of the first transistor Q1, a current flows from the anode to the cathode of the diode D1. However, part of the current flowing to the other end of the capacitor C1 also flows to the control signal generator 6. Therefore, with the generation of a surge voltage or a surge current in the drive circuit 9, it is difficult to quickly raise the voltage at the control electrode of the first transistor Q1, which impairs the quick absorption of the surge voltage or the surge current in the drive circuit 9.

Figure 5:
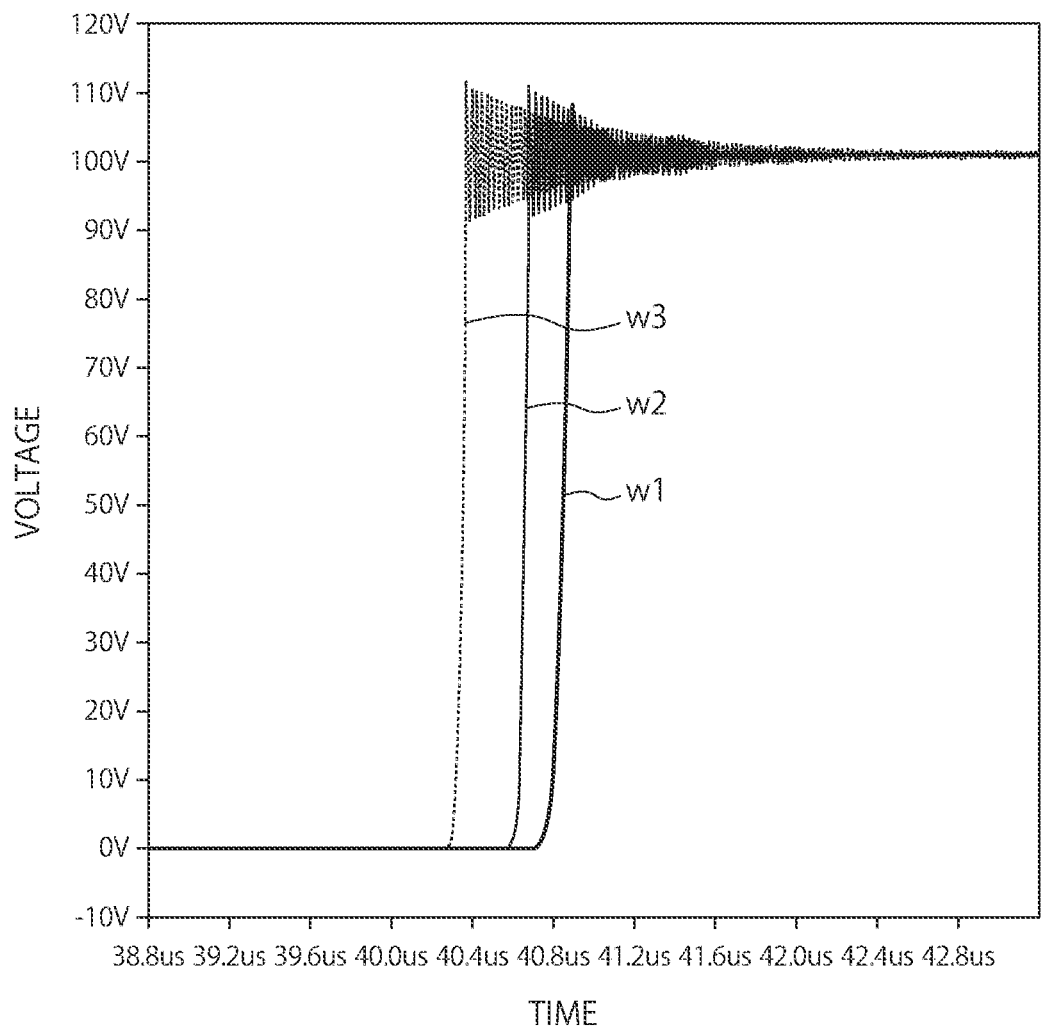
FIG. 5 is a view of drain voltage waveforms of a first transistor immediately after the first transistor changes from on to off.

FIG. 5 is a view of drain voltage waveforms of the first transistor Q1 immediately after the first transistor Q1 changes from on to off. Waveform w1 in FIG. 5 is to a drain voltage waveform of the first transistor Q1 in FIG. 1, waveform w2 is to a drain voltage waveform of the first transistor Q1 in FIG. 4, and waveform w3 is to a drain voltage waveform of a circuit in which the diode D1 and the capacitor C1 are omitted from FIG. 4.

The diode D1 and the capacitor C1 increases the response time until the drain voltage of the first transistor Q1 changes. This is due to a parasitic capacitance of the diode D1. Comparison between the waveforms w2 and w3 shows that the surge control circuit 1 in FIG. 4 prevents surge and ringing to some extent but not to a satisfactory extent.

Comparison between the waveforms w1 and w2 shows that the surge control circuit 1 in FIG. 1 adequately prevents both surge and ringing.

Note that the waveform w1 has a longer response time than the waveform w2 until the drain voltage of the first transistor Q1 changes, but the difference matters little in a practical sense.

Figure 6:
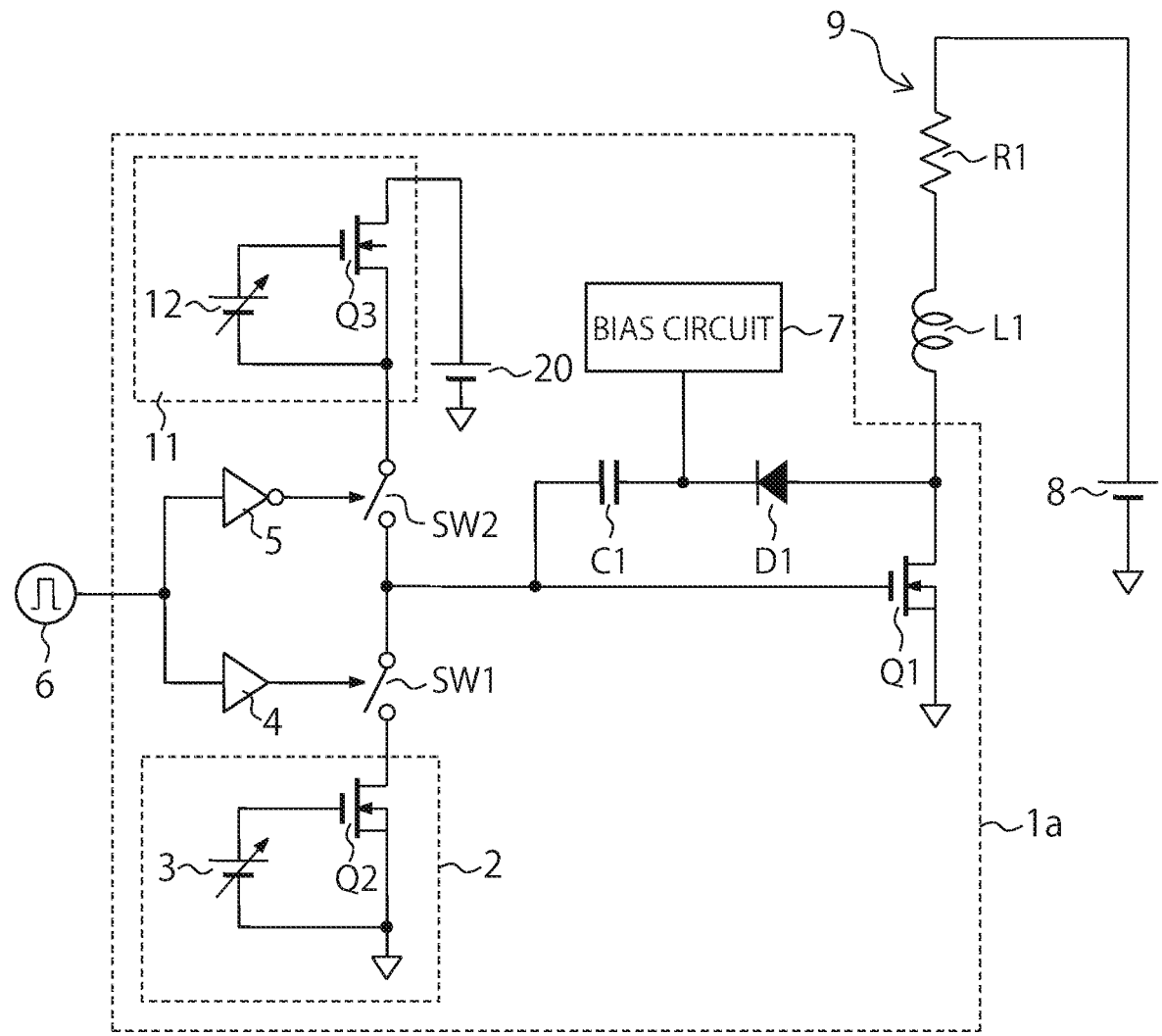
FIG. 6 is a circuit diagram of a surge control circuit in which a second variable impedance circuit is added to the circuit configuration in FIG. 1.

FIG. 6 is a circuit diagram of a surge control circuit 1a in which a second variable impedance circuit 11 is added to the circuit configuration in FIG. 1. The second variable impedance circuit 11 is connected between the second switch SW2 and a third reference voltage node. The third reference voltage node is, for example, a power supply voltage node. The second variable impedance circuit 11 is connected in series to the first switch SW1 and is configured to vary an impedance between the gate of the first transistor Q1 and the third reference voltage node.

The second variable impedance circuit 11 includes a third transistor Q3 and a variable voltage source 12. The third transistor Q3 is, for example, an N-type MOS transistor. The variable voltage source 12 is connected between a gate and a source of the third transistor Q3.

The second variable impedance circuit 11 and the second switch SW2 are paired with the first variable impedance circuit 2 and the first switch SW1. In this manner, the second variable impedance circuit 11 is disposed in the surge control circuit 1a in order to balance the circuit configuration but may be omitted because the second variable impedance circuit 11 does not particularly contribute to the prevention of surge.

In the surge control circuit 1 according to the first embodiment, not only the diode D1 and the capacitor C1 are connected in series between the drain and the gate of the first transistor Q1 but also the first variable impedance circuit 2 is connected between the gate of the first transistor Q1 and the ground node.

In the first variable impedance circuit 2, the variable voltage source 3 is configured to adjust the gate voltage at the second transistor Q2 to enable the analog operation of the second transistor Q2. Accordingly, when a surge voltage or a surge current is generated in the drive circuit 9, it is possible to increase the impedance of the first variable impedance circuit 2 along with an increase in drain voltage at the second transistor Q2. This makes it possible to quickly raise the gate voltage at the first transistor Q1 at the time of surge generation, which causes the ground node to absorb the surge current.

Second Embodiment

In the surge control circuit 1 according to the first embodiment, the second transistor Q2 is required to perform analog operation at the time of surge generation. In a second embodiment, the second transistor Q2 reliably performs analog operation at the time of surge generation.

Figure 7:
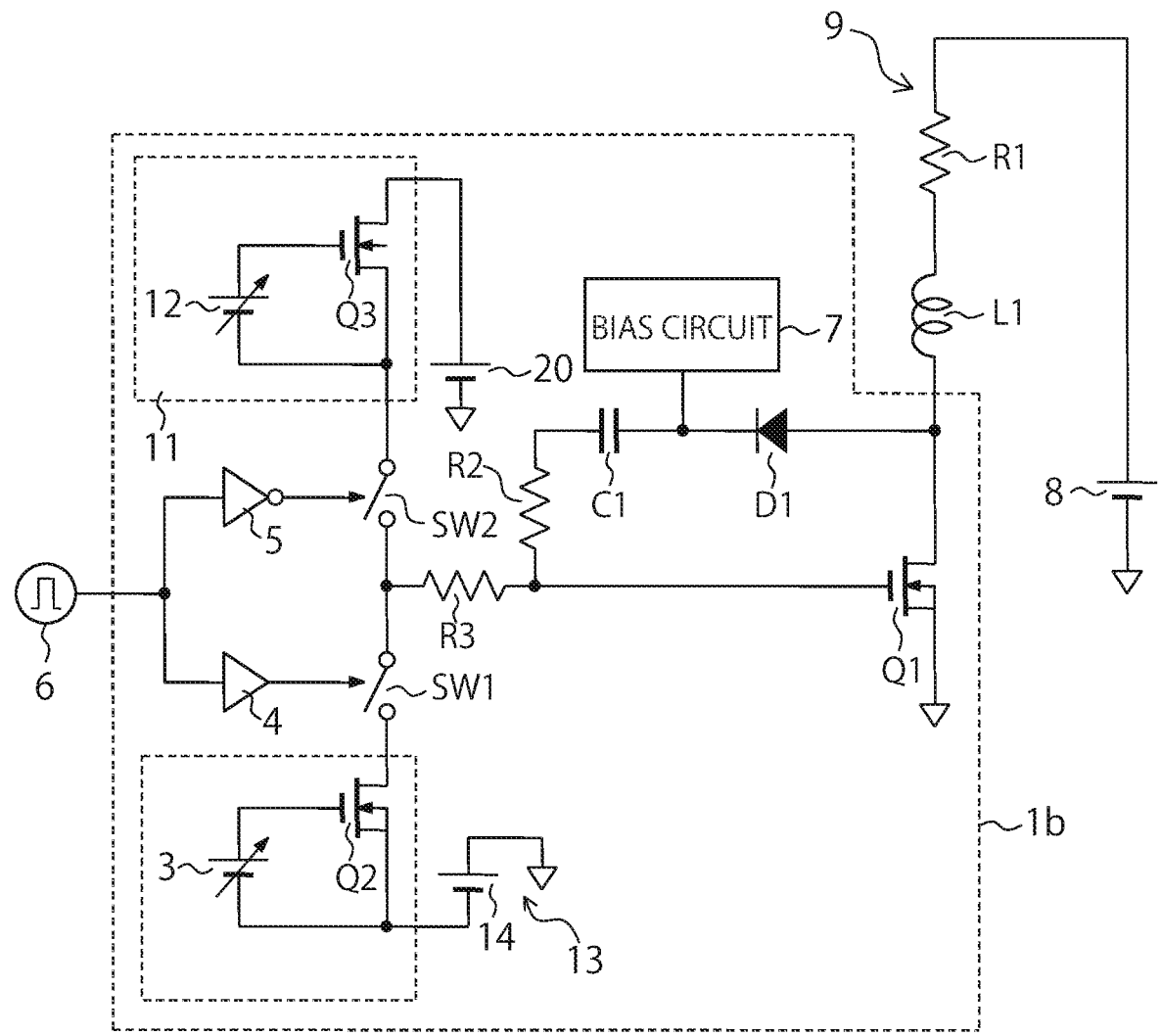
FIG. 7 is a circuit diagram of a surge control circuit according to a second embodiment.

FIG. 7 is a circuit diagram of a surge control circuit 1b according to the second embodiment. The surge control circuit 1b in FIG. 7 includes a negative voltage generation circuit 13 disposed in a first variable impedance circuit 2. The negative voltage generation circuit 13 sets a source voltage at a second transistor Q2 lower than a voltage at a second reference voltage node. The second reference voltage node is, for example, a ground node. The negative voltage generation circuit 13 includes, for example, a DC voltage source 14 connected between a source of the second transistor Q2 and the ground node. The negative voltage terminal of the DC voltage source 14 is connected to the source of the second transistor Q2. Note that the negative voltage generation circuit 13 is not limited to the specific circuit configuration illustrated in FIG. 7.

Setting the source voltage at the second transistor Q2 to a negative voltage makes it possible to shift the operating point on the I-V characteristics in FIG. 2 apparently to the right side, which makes the second transistor Q2 reliably operate in a saturation region or reliably perform the analog operation. Accordingly, when a surge voltage or a surge current is generated in a drive circuit 9, the more the forward current flows to a diode D1, the more the impedance of the first variable impedance circuit 2 increases, which quickly raises a gate voltage at a first transistor Q1 and enables the ground node to absorb the surge current. The surge control circuit 1b in FIG. 7 may exclude a second variable impedance circuit 11.

In the surge control circuit 1b in FIG. 7, a resistor R2 is connected between a capacitor C1 and a gate of the first transistor Q1, and a resistor R3 is connected between the gate of the first transistor Q1 and a first switch SW1 and a second switch SW2. These resistors R2 and R3 may be omitted. Furthermore, the resistors R2 and R3 may be added to the surge control circuits 1 and 1a illustrated in FIGS. 1 and 6.

As described above, in the second embodiment, the source voltage at the second transistor Q2 is a negative voltage. Accordingly, the second transistor Q2 reliably performs analog operation at the time of surge generation, which quickly prevents surge voltages and surge currents.

Third Embodiment

Figure 8:
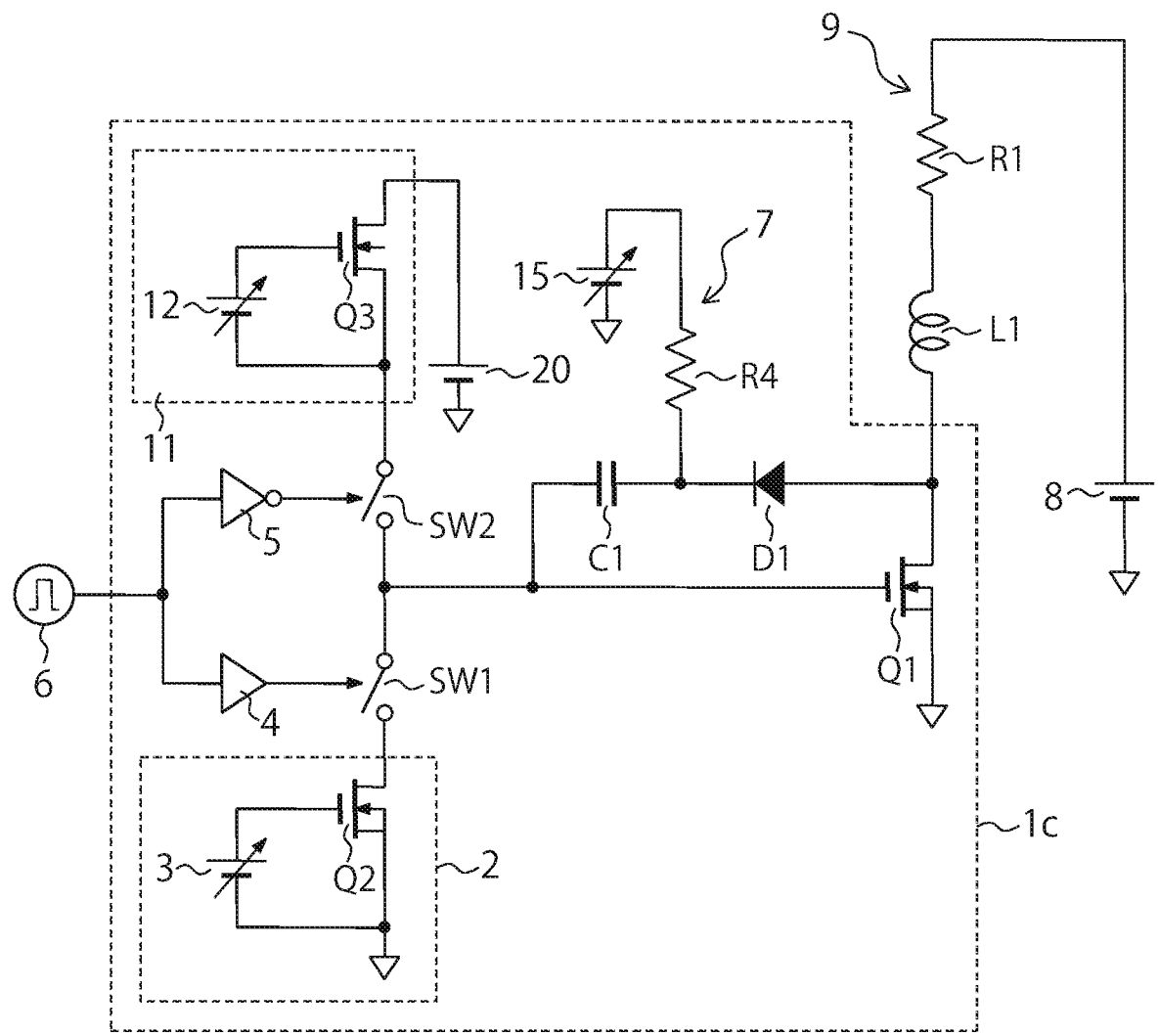
FIG. 8 is a circuit diagram of a surge control circuit according to a third embodiment.

The surge control circuits 1, 1a, and 1b according to the first and second embodiments may be modified to have various circuit configurations. For example, FIG. 8 is a circuit diagram of a surge control circuit 1c according to a third embodiment. The surge control circuit 1c in FIG. 8 is a specific embodiment of the bias circuit 7 disposed in the surge control circuit 1 illustrated in FIG. 1. The bias circuit 7 in FIG. 8 includes a DC voltage source 15 and a resistor R4 connected in series between a cathode of a diode D1 and a first reference voltage node. The bias circuit 7 in FIG. 8 is also applicable to the bias circuit 7 in FIG. 6. Note that the bias circuit 7 may employ any specific circuit configuration and may have a circuit configuration different from one illustrated in FIG. 8. A second variable impedance circuit 11 may be omitted from the surge control circuit 1c in FIG. 8. In addition, resistors R2 and R3 similar to those in FIG. 7 may be added to the surge control circuit 1c in FIG. 8.

Figure 9:
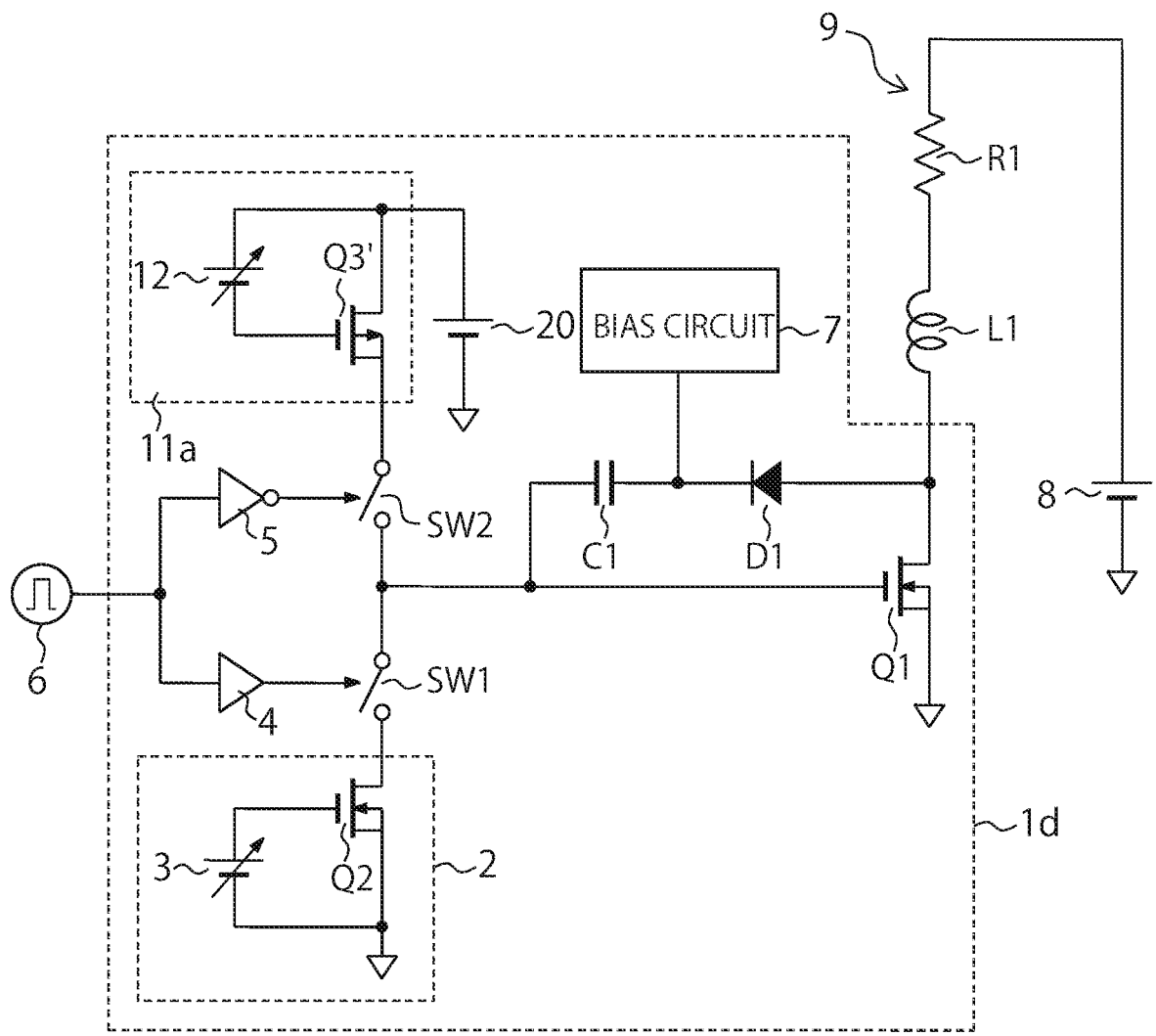
FIG. 9 is a circuit diagram of a surge control circuit according to a first modification of the third embodiment.

FIG. 9 is a circuit diagram of a surge control circuit 1d according to a first modification of the third embodiment. In the surge control circuit 1d in FIG. 9, a third transistor Q3 in the second variable impedance circuit 11 is replaced with a P-type MOS transistor Q3'. Note that a second transistor Q2 in a first variable impedance circuit 2 is typically an N-type MOS transistor.

In each of the surge control circuits 1a, 1b, 1c, and 1d, the first switch SW1 and the second switch SW2 are disposed in the side close to the gate of the first transistor Q1, the second transistor Q2 is disposed in the side close to the second reference potential node (for example, the ground node), and the third transistor Q3 is disposed in the side close to the third reference potential node (for example, the power supply voltage node). However, the arrangement of these members may be inverted.

Figure 10:
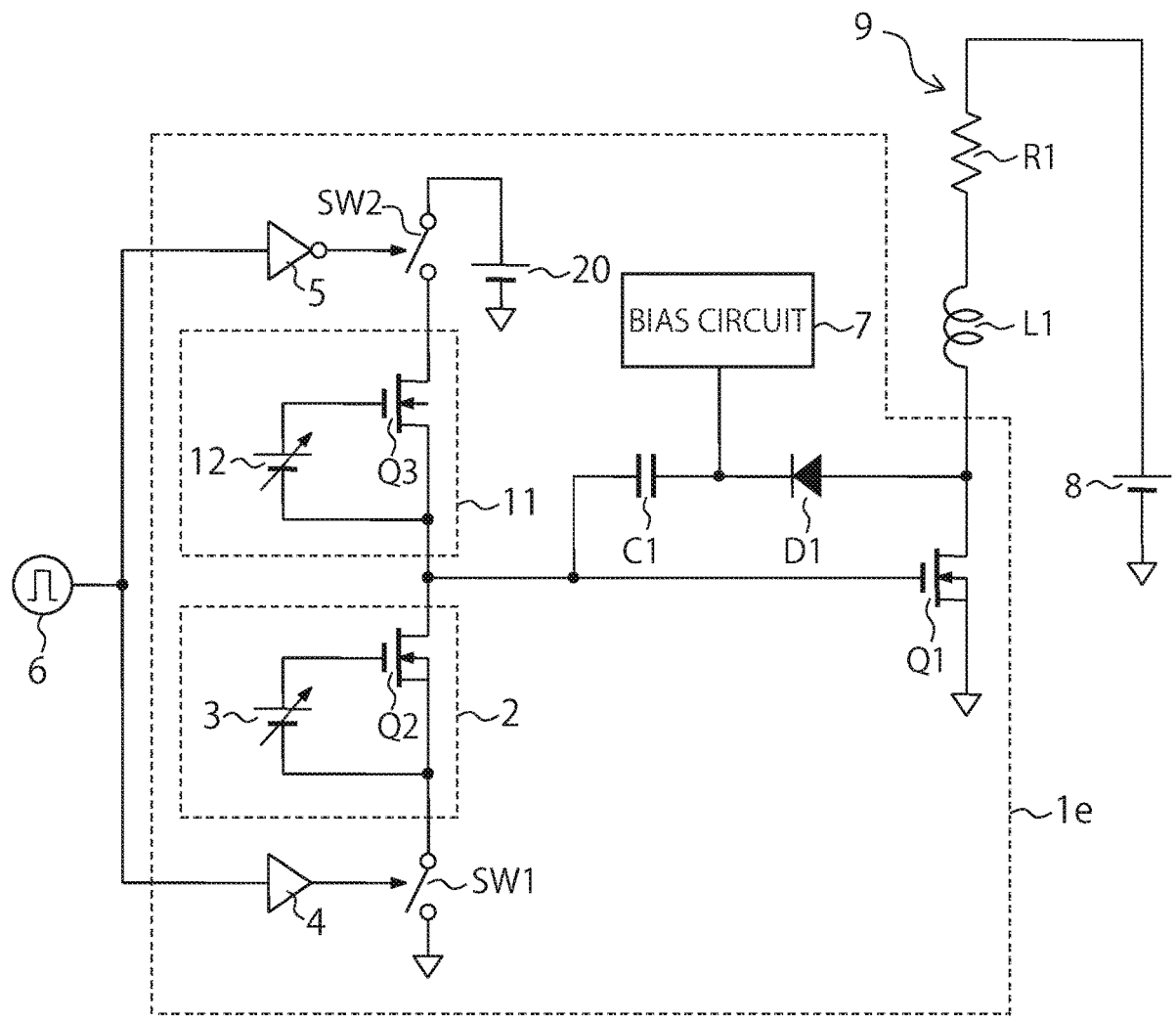
FIG. 10 is a circuit diagram of a surge control circuit according to a second modification of the third embodiment.

FIG. 10 is a circuit diagram of a surge control circuit 1e according to a second modification of the third embodiment.

In the surge control circuit 1e in FIG. 10, the arrangement of the first switch SW1 and the second transistor Q2 is inverted from that illustrated in FIG. 6, and the arrangement of the second switch SW2 and the third transistor Q3 is also inverted from that illustrated in FIG. 6. The third transistor Q3 in FIG. 10 may be omitted. In the surge control circuit 1e in FIG. 10, a variable voltage source 3 is connected between a gate and a source of the second transistor Q2 disposed in the first variable impedance circuit 2, and the first switch SW1 is connected between the source of the second transistor Q2 and a ground node. The configuration of the second variable impedance circuit 11 is similar to that of the first variable impedance circuit 2.

Figure 11:
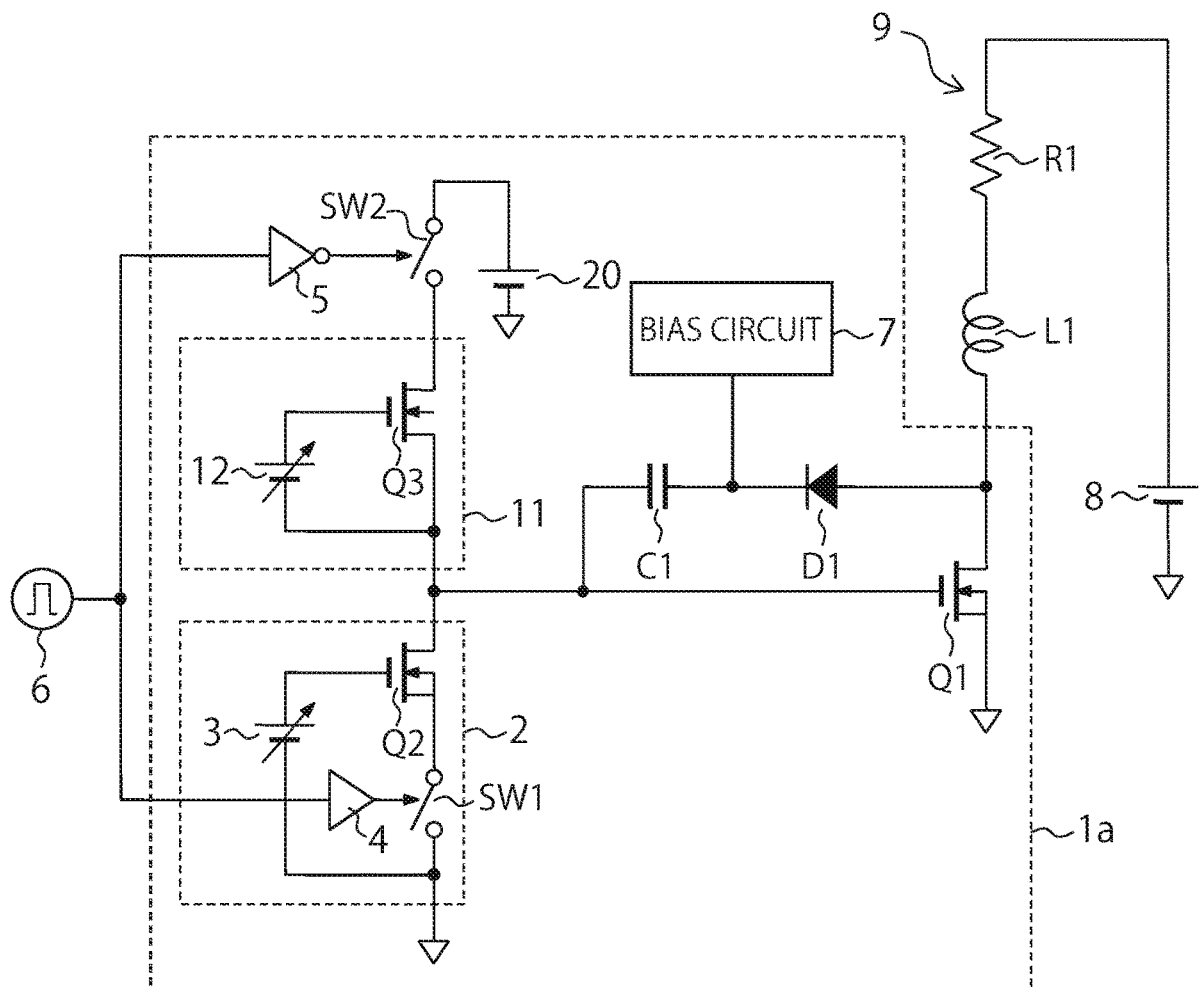
FIG. 11 is a circuit diagram of a surge control circuit according to a third modification of the third embodiment.

FIG. 11 is a circuit diagram of a surge control circuit 1f according to a third modification of the third embodiment. The surge control circuit 1f in FIG. 11 is common to FIG. 10 in that the first switch SW1 is connected between the source of the second transistor Q2 in the first variable impedance circuit 2 and the ground node but is different from FIG. 10 in that the variable voltage source 3 is connected between the gate of the second transistor Q2 and the ground node. The second variable impedance circuit 11 may be omitted in the surge control circuits 1e and 1f in FIGS. 10 and 11.

As described above, the surge control circuit according to the present disclosure may have various circuit configurations. However, in any circuit configuration, the surge control circuit is provided with the diode D1, the capacitor C1, and the first variable impedance circuit 2, and when a surge voltage or a surge current is generated in the drive circuit 9, the more the forward current flows to the diode D1, the more the impedance of the first variable impedance circuit 2 increases. Accordingly, it is possible to quickly raise the gate voltage at the first transistor Q1, which enables the ground node to absorb the surge current and enhances the surge prevention effect.

Figure 12:
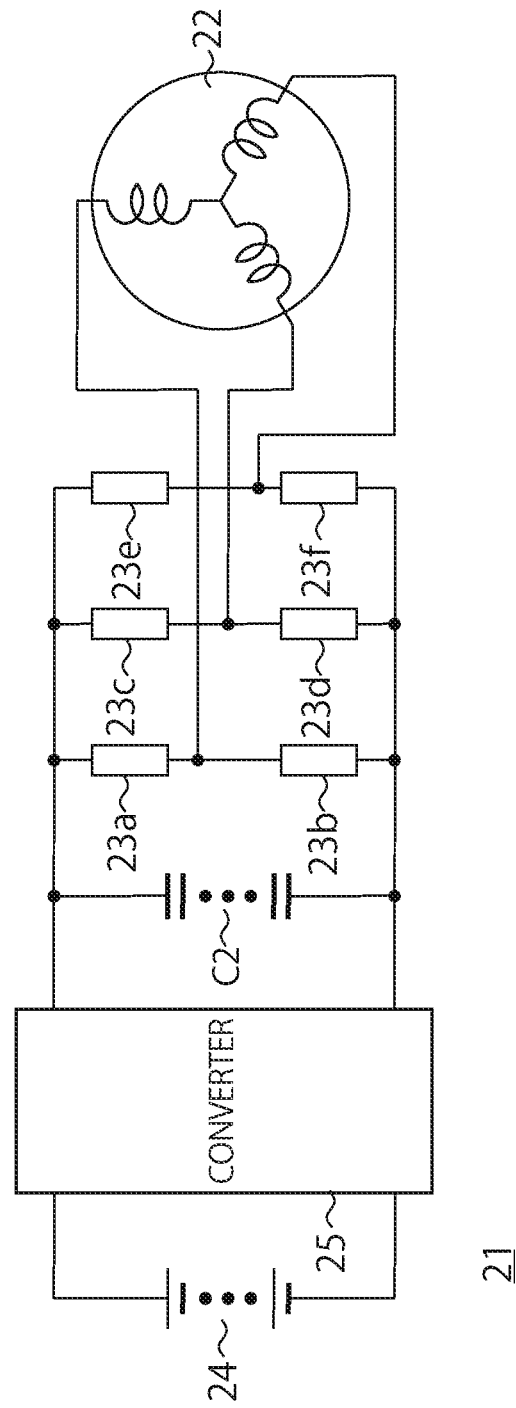
FIG. 12 is a circuit diagram illustrating an example of a power transducer.

The surge control circuits 1 to 1f having the aforementioned various circuit configurations may be employed in a power transducer 21. FIG. 12 is a circuit diagram illustrating an example of the power transducer 21. The power transducer 21 can be also called as an electronic apparatus. The power transducer 21 in FIG. 12 generates an AC voltage for driving a three-phase motor 22. The power transducer 21 in FIG. 12 includes a plurality of arms 23a to 23f, a DC source 24, a converter 25, and a smoothing capacitor C2.

Each of the plurality of arms 23a to 23f includes any one of the surge control circuits 1 to 1f having the aforementioned circuit configurations and is turned on or off at a predetermined timing.

The converter 25 is a DC-DC converter and converts a DC voltage from the DC source 8 into a DC voltage having different voltage level. The smoothing capacitor C2 smooths the voltage output from the converter 25.

Among the six arms 23a to 23f, two arms are simultaneously turned on and a current is applied to corresponding coils inside the motor 22. The motor 22 is driven in three phases by sequentially switching the two arms that are simultaneously turned on.

Note that the power transducer 21 is not limited to the specific circuit configuration illustrated in FIG. 12.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. An electronic circuit comprising:
    a diode to carry a surge current generated by switching of a first transistor;
    a capacitor connected between a cathode of the diode and a control electrode of the first transistor; and
    a first variable impedance circuit configured to vary an impedance between the control electrode of the first transistor and a first reference voltage node according to the surge current flowing to the diode,
    wherein the first variable impedance circuit includes:
        a second transistor connected between the control electrode of the first transistor and a second reference voltage node; and
        a variable voltage source configured to vary a voltage between a control electrode of the second transistor and the second reference voltage node, and
        wherein the variable voltage source sets a voltage at the control electrode of the second transistor to make a current flowing between a first electrode and a second electrode of the second transistor vary linearly with respect to a voltage at the first electrode of the second transistor when the surge current flows to the diode.

2. The electronic circuit according to claim 1,
    wherein the first variable impedance circuit increases the impedance between the control electrode of the first transistor and the first reference voltage node along with an increase of the surge current flowing to the diode.

3. The electronic circuit according to claim 1,
    wherein the surge current from a first electrode of the first transistor flows from an anode of the diode to the control electrode of the first transistor via the cathode of the diode and the capacitor.

4. The electronic circuit according to claim 3,
    wherein the anode of the diode is connected to the first electrode of the first transistor,
    the cathode of the diode is connected to one end of the capacitor, and
    the capacitor has another end connected to the control electrode of the first transistor.

5. The electronic circuit according to claim 1,
    wherein the variable voltage source sets the voltage at the control electrode of the second transistor based on a voltage or a current between the first electrode and the second electrode of the first transistor.

6. The electronic circuit according to claim 1,
    wherein the second transistor includes a third electrode having a voltage level that changes according to the control electrode of the first transistor and a fourth electrode having a voltage level set according to the second reference voltage node, and
    the electronic circuit further comprises a negative voltage generation circuit configured to set the fourth electrode of the second transistor to have a voltage lower than a voltage at the second reference voltage node.

7. The electronic circuit according to claim 1, further comprising
    a second variable impedance circuit connected between the control electrode of the first transistor and a third reference voltage node having a voltage level higher than a voltage level of the second reference voltage node, wherein the second variable impedance circuit is located symmetrical to the control electrode of the first transistor with the first variable impedance circuit.

8. The electronic circuit according to claim 7, further comprising:
a first switch to switch whether a control electrode of the first transistor is set to off- or on-voltage at the first transistor; and
a second switch to control whether the control electrode of the first transistor is set to on- or off-voltage at the second transistor,
wherein the first variable impedance circuit and the first switch are connected in series between the control electrode of the first transistor and the second reference voltage node, and
the second variable impedance circuit and the second switch are connected in series between the control electrode of the first transistor and the third reference voltage node.

9. An electronic apparatus comprising
a power transduction unit configured to transduce a DC voltage to an AC voltage, wherein the power transduction unit comprises:
a plurality of first transistors to be turned on or off at different timings;
a switching controller configured to perform on/off control of the plurality of first transistors; and
a plurality of electronic circuits configured to control surge generation when the plurality of first transistors is turned on or off,
each of the electronic circuits comprising
a diode to carry a surge current generated by switching of a corresponding first transistor,
a capacitor connected between a cathode of the diode and a control electrode of the first transistor, and
a first variable impedance circuit configured to vary an impedance between the control electrode of the first transistor and a first reference voltage node according to the surge current flowing to the diode,
wherein the first variable impedance circuit includes:
a second transistor connected between the control electrode of the first transistor and a second reference voltage node;
a variable voltage source configured to vary a voltage between a control electrode of the second transistor and the second reference voltage node, and
wherein the variable voltage source sets a voltage at the control electrode of the second transistor to make a current flowing between a first electrode and a second electrode of the second transistor vary linearly with respect to a voltage at the first electrode of the second transistor when the surge current flows to the diode.

10. The electronic apparatus according to claim 9,
wherein the first variable impedance circuit increases the impedance between the control electrode of the first transistor and the first reference voltage node along with an increase of the surge current flowing to the diode.

11. The electronic apparatus according to claim 9,
wherein the surge current from a first electrode of the first transistor flows from an anode of the diode to the control electrode of the first transistor via the cathode of the diode and the capacitor.

12. The electronic apparatus according to claim 11,
wherein the anode of the diode is connected to the first electrode of the first transistor,
the cathode of the diode is connected to one end of the capacitor, and
the capacitor has another end connected to the control electrode of the first transistor.

13. The electronic apparatus according to claim 9,
wherein the variable voltage source sets the voltage at the control electrode of the second transistor based on a voltage or a current between the first electrode and the second electrode of the first transistor.

14. The electronic apparatus according to claim 9,
wherein the second transistor includes a third electrode having a voltage level that changes according to the control electrode of the first transistor and a fourth electrode having a voltage level set according to the second reference voltage node, and
the electronic apparatus further comprises a negative voltage generation circuit configured to set the fourth electrode of the second transistor to have a voltage lower than a voltage at the second reference voltage node.

15. The electronic apparatus according to claim 9, further comprising
a second variable impedance circuit connected between the control electrode of the first transistor and a third reference voltage node having a voltage level higher than a voltage level of the second reference voltage node, wherein
the second variable impedance circuit is located symmetrical to the control electrode of the first transistor with the first variable impedance circuit.

16. The electronic apparatus according to claim 15, further comprising:
a first switch to switch whether a control electrode of the first transistor is set to off- or on-voltage at the first transistor; and
a second switch to switch whether the control electrode of the first transistor is set to on- or off-voltage at the second transistor,
wherein the first variable impedance circuit and the first switch are connected in series between the control electrode of the first transistor and the second reference voltage node, and
the second variable impedance circuit and the second switch are connected in series between the control electrode of the first transistor and the third reference voltage node.

17. An electronic circuit comprising:
a diode to carry a surge current generated by switching of a first transistor;
a capacitor connected between a cathode of the diode and a control electrode of the first transistor; and
a first variable impedance circuit configured to vary an impedance between the control electrode of the first transistor and a first reference voltage node according to the surge current flowing to the diode,
wherein the first variable impedance circuit includes:
a second transistor connected between the control electrode of the first transistor and a second reference voltage node;
a variable voltage source configured to vary a voltage between a control electrode of the second transistor and the second reference voltage node; and
wherein the second transistor includes a third electrode having a voltage level that changes according to the control electrode of the first transistor and a fourth electrode having a voltage level set according to the second reference voltage node, and the electronic circuit further comprises a negative voltage generation circuit configured to set the fourth electrode of the second transistor to have a voltage lower than a voltage at the second reference voltage node.

18. An electronic apparatus comprising:
a power transduction unit configured to transduce a DC voltage to an AC voltage, wherein the power transduction unit comprises:
   a plurality of first transistors to be turned on or off at different timings;
   a switching controller configured to perform on/off control of the plurality of first transistors; and
   a plurality of electronic circuits configured to control surge generation when the plurality of first transistors is turned on or off,
   each of the electronic circuits comprising:
      a diode to carry a surge current generated by switching of a corresponding first transistor,
      a capacitor connected between a cathode of the diode and a control electrode of the first transistor, and
      a first variable impedance circuit configured to vary an impedance between the control electrode of the first transistor and a first reference voltage node according to the surge current flowing to the diode, wherein the first variable impedance circuit includes:
   a second transistor connected between the control electrode of the first transistor and a second reference voltage node;
   a variable voltage source configured to vary a voltage between a control electrode of the second transistor and the second reference voltage node, and wherein the second transistor includes a third electrode having a voltage level that changes according to the control electrode of the first transistor and a fourth electrode having a voltage level set according to the second reference voltage node, and wherein the electronic apparatus further comprises a negative voltage generation circuit configured to set the fourth electrode of the second transistor to have a voltage lower than a voltage at the second reference voltage node.

\* \* \* \* \*